United States Patent [19]

Yagi et al.

[11] Patent Number: 5,325,252
[45] Date of Patent: Jun. 28, 1994

[54] MAGNETIC DISC APPARATUS HAVING TWO FLEXIBLE BENDING MEMBERS OF AN FPC BETWEEN A FIXING PORTION AND A ROCKING ACTUATOR BENT IN OPPOSITE DIRECTIONS

[75] Inventors: Yuji Yagi, Neyagawa; Michiro Tanaka, Ikoma; Makoto Kuwamoto, Hirakata; Hiroshi Kohso, Fujiidera, all of Japan

[73] Assignee: Matsushita Electric Industrial Co., Ltd., Kadoma, Japan

[21] Appl. No.: 975,630

[22] Filed: Nov. 13, 1992

[30] Foreign Application Priority Data

Nov. 14, 1991 [JP] Japan .................................. 3-298726

[51] Int. Cl.$^5$ .......................... G11B 5/54; G11B 21/08
[52] U.S. Cl. .................. 360/106; 360/97.01; 360/105
[58] Field of Search ............ 360/106, 105, 97.01, 360/97.02

[56] References Cited

U.S. PATENT DOCUMENTS

| | | | |
|---|---|---|---|
| 4,476,404 | 10/1984 | Bygdnes | 310/27 |
| 5,055,969 | 10/1991 | Putnam | 361/398 |
| 5,095,396 | 3/1992 | Putnam et al. | 360/106 |
| 5,105,321 | 4/1992 | Ohkita et al. | 360/106 |
| 5,161,074 | 11/1992 | Forbord et al. | 360/97.01 |
| 5,172,287 | 12/1992 | Ishida | 360/106 X |
| 5,212,679 | 5/1993 | Tohkairin | 360/97.02 X |

FOREIGN PATENT DOCUMENTS

0234442A1  2/1987  European Pat. Off. .
3097114    4/1991  Japan .

Primary Examiner—John H. Wolff
Attorney, Agent, or Firm—Wenderoth, Lind & Ponack

[57] ABSTRACT

A magnetic disc apparatus has a rocking type actuator driven in a rocking motion by the driving force of a VCM (voice coil motor). Two flexible bending members fixed to a rotor move in synchronization with the driving of the rocking type actuator. The respective flexible bending members are attached to two FPC (Flexible printed circuit sheet) fixing portions provided on the outer wall of the rotor and radially arranged with respect to the driving center of the rocking type actuator so as to have the bending portions bent in directions opposite to each other. The reaction forces of the flexible printed circuit sheets are then canceled out with respect to each other at all times, and hardly affect the driving of the actuator. Therefore, reserve power may be given to the VCM (voice coil motor) while an actuator having a favorable follow-up characteristic with respect to data tracks can be obtained.

8 Claims, 5 Drawing Sheets

MAGNETIC DISC APPARATUS HAVING TWO FLEXIBLE BENDING MEMBERS OF AN FPC BETWEEN A FIXING PORTION AND A ROCKING ACTUATOR BENT IN OPPOSITE DIRECTIONS

BACKGROUND OF THE INVENTION

1. Field of the Invention

The present invention generally relates to a magnetic disc apparatus, and more particularly to a flexible printed circuit sheet employed for transmission of electrical signals between a rocking type actuator of the magnetic disc apparatus and external electrical circuits.

2. Description of the Prior Art

Conventionally, in a magnetic disc apparatus as referred to above, since flexibility is required for effecting electrical wirings to a magnetic head 3' (FIG. 4.) subjected to rocking driving together with a rocking type actuator 2-1' and a voice coil motor (referred to as a VCM hereinafter) 2-4', etc., a flexible printed circuit sheet (referred to as FPC hereinafter) 1-1' has been employed as shown, for example, in a known magnetic disc apparatus of FIG. 4. In the known arrangement of FIG. 4, a flexible bending portion 1-2', subjected to a bending motion as the rocking type actuator 2-1' is driven, is branched from an apparatus fixing portion 1-3' folded back at right angles, and is fixed, in the bent state, to an FPC fixing portion 2-3b' provided on the outer wall of a rotor 2-3a', and thus repeatedly bent and extended following driving of the rocking type actuator 2-1' as shown in FIG. 5, in which acting directions of reaction forces are represented by numeral 5', and driving forces by numeral 6'. In the above case, the FPC fixing portion 2-3b' has a shape making a certain angle so that it may not contact other members during driving of the flexible bending portion 1-2', while the flexible bending portion 1-2' is also limited to a length so that it will not contact other members.

In the conventional construction as described above, however, a reaction force in one direction due to a restoring force of the flexible bending portion 1-2' is applied at all times to the FPC fixing portion 2-3b' and the rotor 2-3a', i.e. to the rocking type actuator 2-1'. Such a reaction force not only results in a loss of torque in the VCM 2-4', but adverse affects such as an offset or the like may result during tracing of the data track. Therefore, the conventional practices for eliminating such disadvantages have been such that the length of the flexible bending portion 1-2' is increased as far as possible, and its width is reduced in order to minimize the reaction force, while the bending radius thereof is set to be as large as possible, and moreover, the flexible bending portion 1-2' is attached so that the reaction force is directed in a direction perpendicular to the driving direction of the rocking type actuator 2-1'. However, the practices as described above do not necessarily provide solutions to the problem, due to limitations in the reduction of size and the configuration of the apparatus, and accordingly it becomes necessary to provide a method generally applicable to any type of apparatus. Meanwhile, in order to realize a thin type of drive, it becomes necessary to reduce the width of the flexible bending portion 1-2', thus requiring a narrowing of the pattern intervals, but at the present stage, it is difficult to narrow the intervals more than a certain level in order to satisfy the strength, performance and manufacturing limits, etc. Furthermore, there is another defect in that, for reducing intervals between patterns, noises between the head line and the VCM line are undesirably carried by the signals from the magnetic head.

SUMMARY OF THE INVENTION

Accordingly, an essential object of the present invention is provide a magnetic disc apparatus which includes a flexible printed circuit sheet capable of suppressing the reaction force of a rocking type actuator to a minimum, and also reducing the size of the apparatus, with a simultaneous removal of noises.

Another object of the present invention is to provide a magnetic disc apparatus of the above described type, which is simple in construction and stable in function with a high reliability.

For solving the problems as described above, in the magnetic disc apparatus according to the present invention, a flexible bending portion is divided into two flexible bending members and attached to two projecting portions radially arranged with respect to the driving center of the rocking type actuator provided on an outer wall of a rotor so as to be directed in directions opposite to each other. Moreover, the two flexible bending members i.e., two flexible printed circuit sheets, are adapted to be separated by quite different signal lines at a magnetic head signal line side and a voice coil motor signal line side.

More specifically, according to one preferred embodiment of the present invention, there is provided a magnetic disc apparatus which includes a magnetic head for reading or writing data from or into a magnetic disc, a rocking type actuator including an arm for supporting the magnetic head, a rotor for rocking and driving the arm and a VCM (voice coil motor) for applying a driving force to the rotor, and an FPC (flexible printed circuit sheet) having a flexible bending portion and an apparatus fixing portion for transmission of electrical signals between the magnetic head subjected to the rocking driving and the VCM, and an external fixed electrical circuit. The flexible bending portion is composed of two flexible bending members, with two projecting portions radially arranged with respect to a driving center being provided on an outer wall of the rotor. The two flexible bending members are respectively attached to the two projecting portions so as to be bent in directions opposite to each other.

Furthermore, the two flexible bending members are arranged to be separated by a magnetic head signal line and a VCM signal line.

By the construction according to the present invention as described above, due of the arrangement to dividing the flexible bending portion in two directions, although the projecting portions on the rotor outer wall are subjected to reaction forces from respective flexible bending members, since the bending portions are directed in opposite directions, the respective reaction forces are canceled out with respect to each other. Accordingly, the torque loss applied in one direction with respect to the rocking type actuator becomes small. Moreover, the width of the FPC (flexible printed circuit sheet) may be made narrower than in the conventional arrangements, and the height of the drive may be reduced. Furthermore, by the separation of the magnetic head line and the VCM line, the defect that noises are contained in the signals from the magnetic head may be advantageously prevented.

BRIEF DESCRIPTION OF THE DRAWINGS

The above and other objects and features of the present invention will become clear from the following description taken in conjunction with a preferred embodiment thereof and with reference to the accompanying drawings, in which.

DETAILED DESCRIPTION OF THE INVENTION

Figure 1:
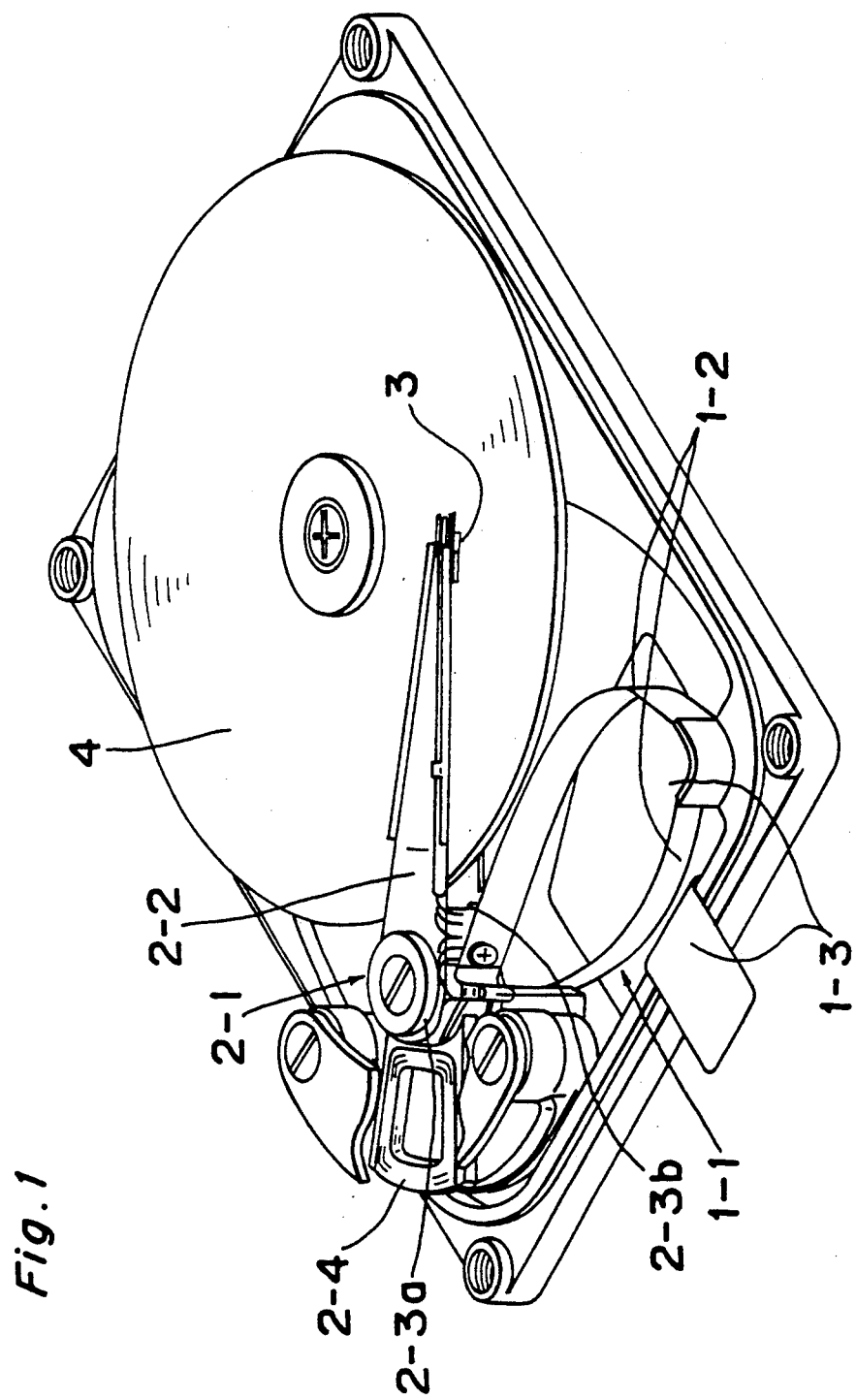
FIG. 1 is a perspective view of a magnetic disc apparatus according to one preferred embodiment of the present invention.

Before the description of the present invention proceeds, it is to be noted that like parts are designated by like reference numerals throughout the accompanying drawings.

Referring now to the drawings, there is shown in FIG. 1 a magnetic disc apparatus according to one preferred embodiment of the present invention which includes a magnetic head 3 for reading or writing data from or into a magnetic disc 4, a rocking type actuator 2-1 including an arm 2-2 for supporting the magnetic head 3, a rotor 2-3a for rocking and driving the arm 2-2 and a VCM (voice coil motor) 2-4 for applying a driving force to the rotor 2-3a, and an FPC (flexible printed circuit sheet) 1-1 having a flexible bending portion 1-2 and an apparatus fixing portion 1-3 for transmission of electrical signals between said magnetic head 3 subjected to the rocking driving and said VCM 2-4 and an and external fixed electrical circuit. The flexible bending portion 1-2 is composed of two flexible bending members, with two projecting portions 2-3 radially arranged with respect to a driving center being provided on an outer wall of said rotor 2-3a. The two flexible bending members are respectively attached to the two projecting portions 2-3b so as to be bent in directions opposite to each other.

More specifically, as shown in FIG. 1, the rocking type actuator 2-1 has the magnetic head 3 at its forward end, and the VCM 2-4 at its rear end, and the respective signals thereof are transmitted to external electrical circuits, etc. (not shown) through the flexible bending portion 1-2 of the FPC 1-1 fixed to the FPC fixing portion 2-3b on the outer wall of the driving portion of the rotor 2-3a. The FPC 1-1 includes the flexible bending portion 1-2 subjected to bending motion as the rocking type actuator 2-1 is driven, and the apparatus fixing portion 1-3 is fixed to the magnetic disc apparatus and has a connector portion for connecting to the external electrical circuits. Meanwhile, the flexible bending portion 1-2 consists of two flexible bending members which are respectively fixed to the two FPC fixing portions 2-3b provided on the outer wall of the rotor 2-3a and radially disposed with respect to the driving center in such a manner that the bending portions thereof are directed in opposite directions to each other.

Figure 2:
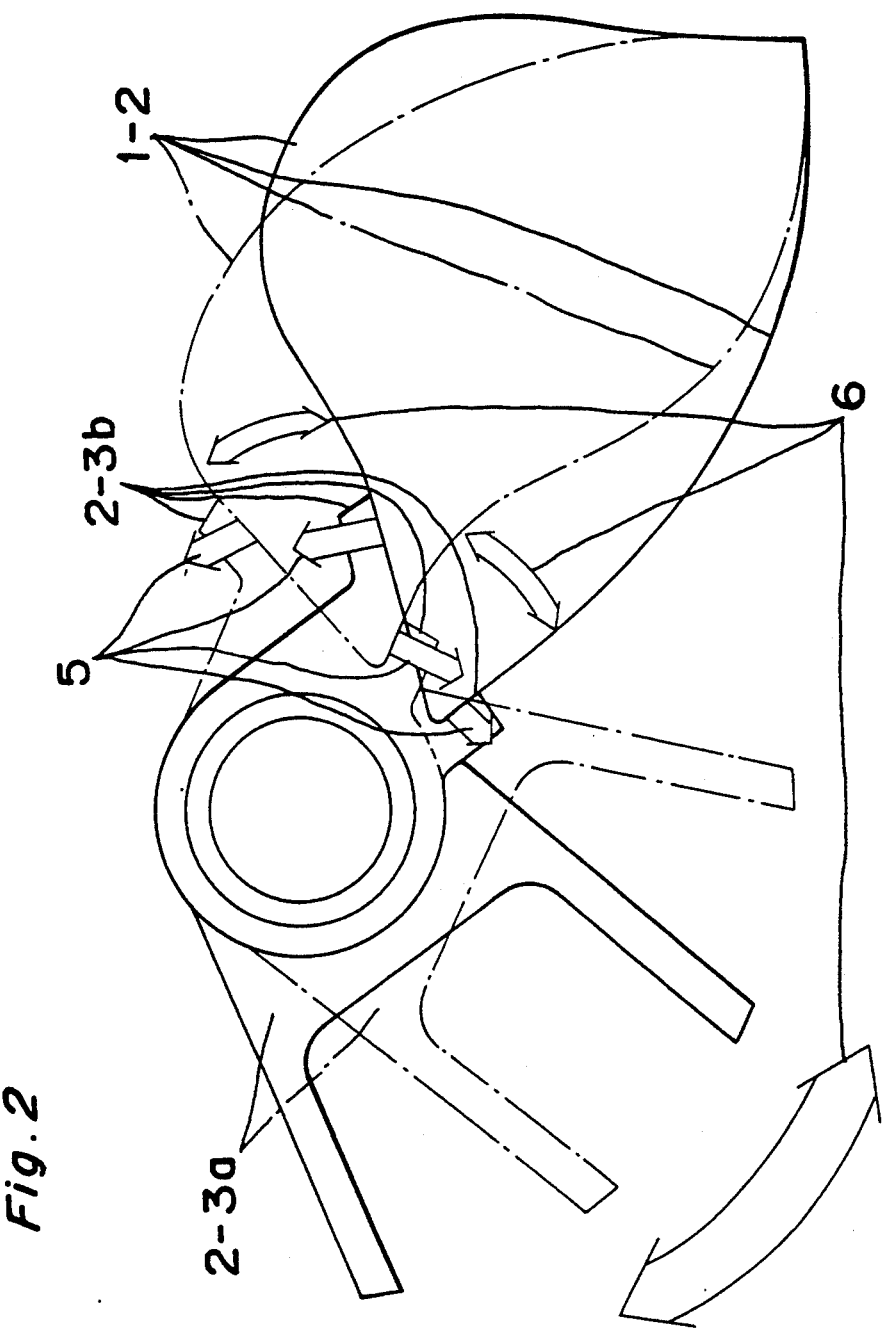
FIG. 2 is a fragmentary top plan view for explaining functioning state of an FPC (flexible printed circuit sheet) employed in the arrangement of FIG. 1.

Referring also to FIG. 2, the state of functioning of the flexible bending portion in the magnetic disc apparatus as described so far will be explained hereinafter. In FIG. 2, acting directions of reaction forces are represented by number 5, while the driving directions, by numeral 6.

Figure 5:
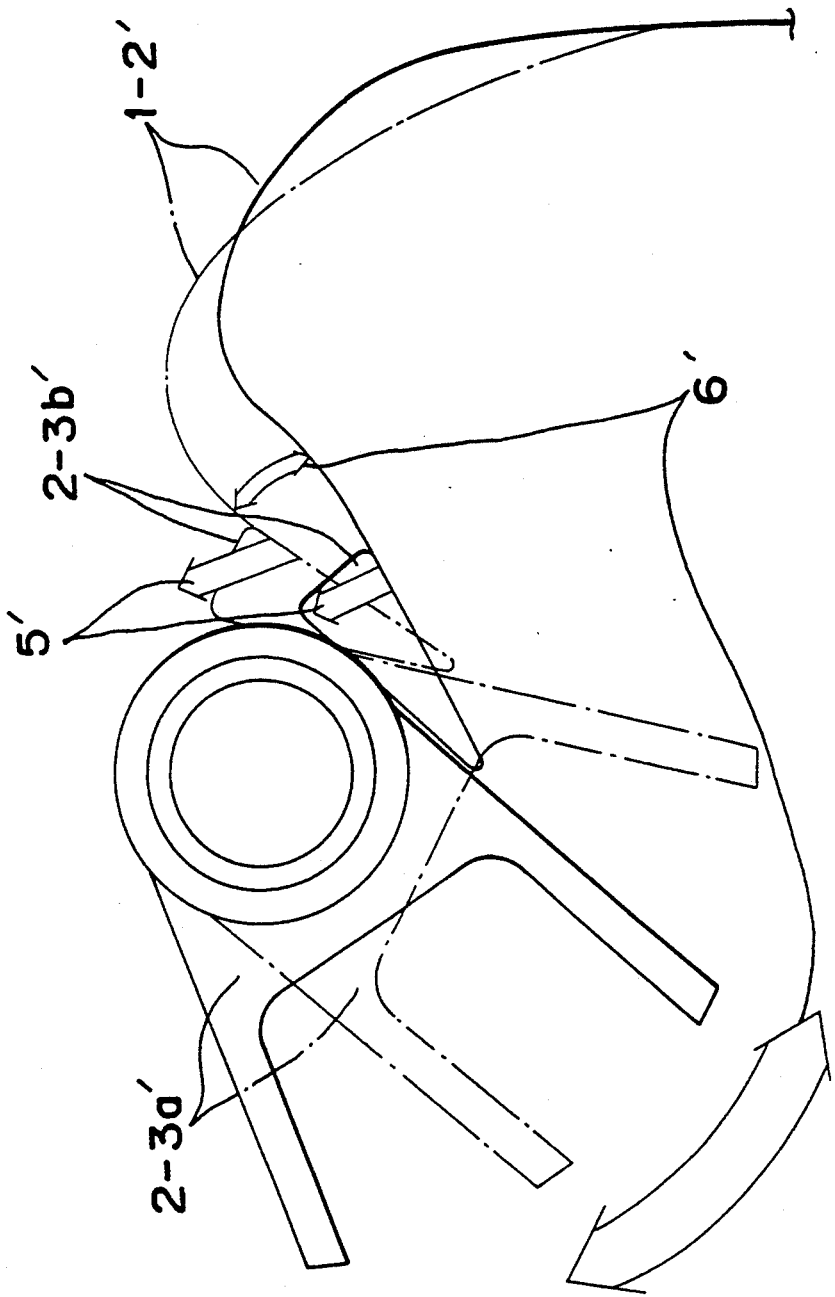
FIG. 5 is a view similar to FIG. 2, which particularly relates to the conventional arrangement of FIG. 4.

In FIG. 2, there is shown the functioning state of the flexible bending portion 1-2 when the rocking type actuator 2-1 i.e., rotor 2-3a, is subjected to the maximum displacement, and as is seen from FIG. 2, the reaction forces are applied in two directions and are canceled with respect to each other in the driving direction. Upon a comparison of the above state with that explained earlier with reference to the conventional arrangement of FIG. 5, it is seen that in the conventional arrangement, a reduction of the reaction force is not easy, and moreover, in order to obtain the driving portion of the flexible bending portion, a disposition of members other than the driving section and a reduction of size of the apparatus are also limited. On the contrary, according to the present invention, since the angle of the projecting portions which serve as the FPC fixing portion can be varied as desired, contact of the flexible bending portion with other members may be readily prevented without deterioration due the influence of the reaction force. Moreover, by dividing the flexible bending portion into two flexible bending members, the width of the flexible bending portion may be made narrower than in the conventional arrangement, thus making it possible to form the drive thinner in structure.

Figure 3:
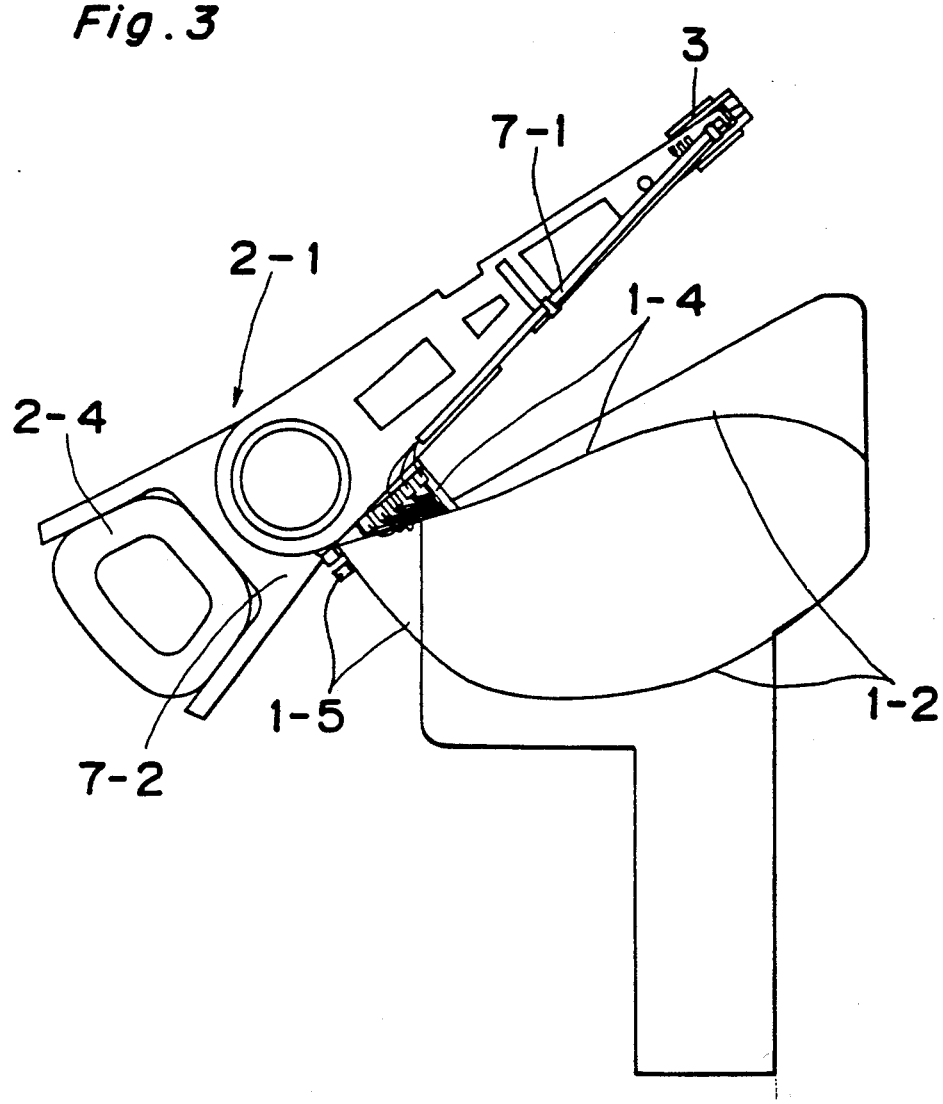
FIG. 3 is a fragmentary top plan view of an essential portion of a magnetic disc apparatus according to a second embodiment of the present invention.
Figure 4:
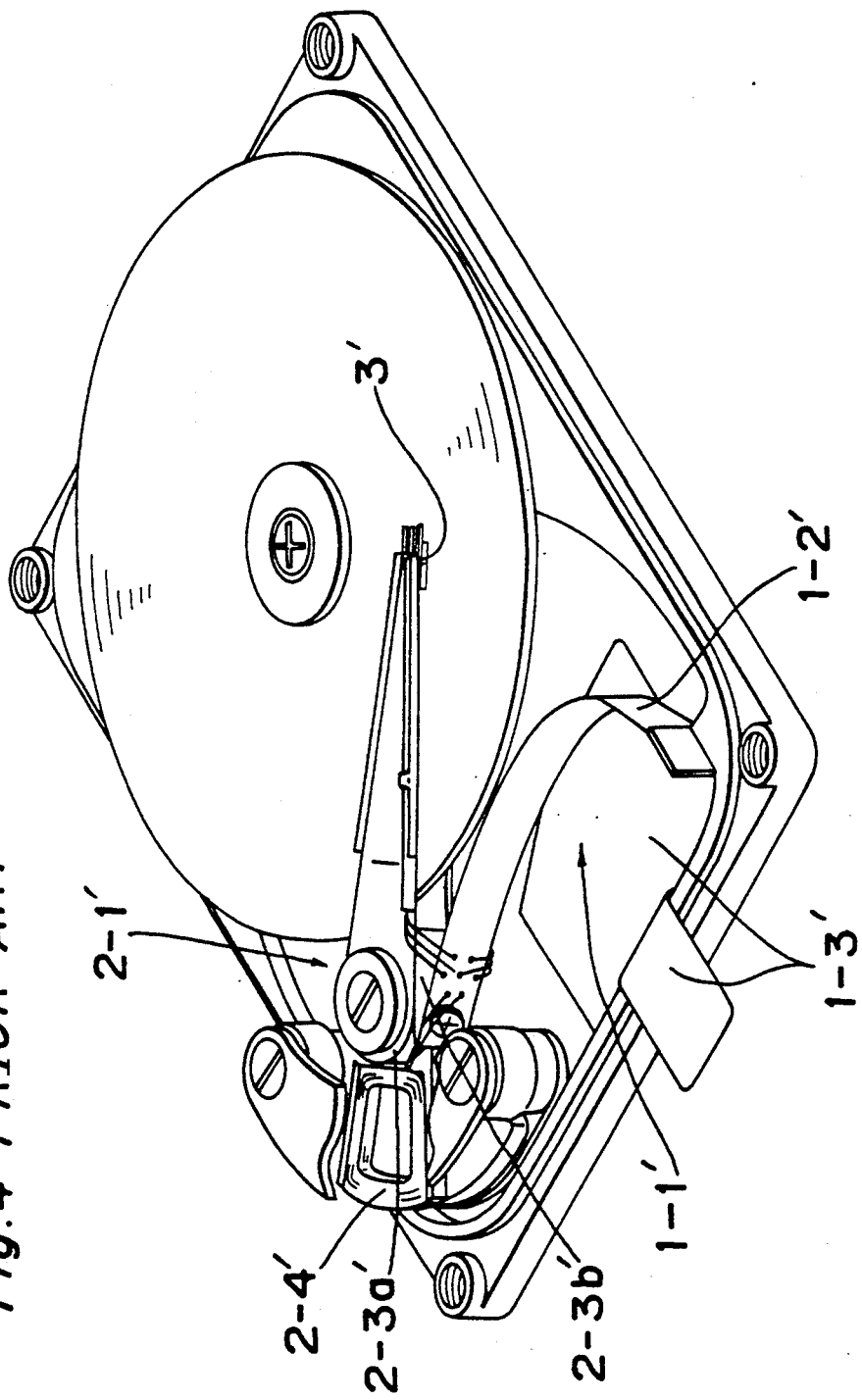
FIG. 4 is a view similar to FIG. 1, which particularly shows a conventional magnetic disc apparatus.

Referring further to FIG. 3, there is shown a magnetic disc apparatus according to a second embodiment of the present invention, in which a head line side FPC is shown by numeral 1-4, a VCM line side FPC is denoted by numeral 1-5, a head signal line is indicated by numeral 7-1, and a VCM signal line by numeral 7-2, with like parts in the first embodiment of FIG. 1 being designated in FIG. 3 by like reference numerals for brevity of explanation.

Although the construction of the magnetic disc apparatus of the second embodiment in FIG. 3 is generally similar to that for the first embodiment in FIG. 1, in the second embodiment, the two flexible bending members 1-2 are separated into the head line side 7-1 and a VCM line side 7-2, which are patterns entirely different in the signals to be transmitted. In connection with the above, in the conventional single flexible bending portion, there are such disadvantages that two kinds of patterns are to be disposed side by side, and noises are generated in the signal from the magnetic head 3.

According to the second embodiment in FIG. 3, the respective patterns are completely separated, and the problem as referred to above may be solved.

As is clear from the foregoing description, according to the magnetic disc apparatus of the present invention, by separating the flexible bending portion in two directions, the reaction force of the flexible bending portion acting on the rocking type actuator may be reduced to provide reserve power to the VCM, with a simultaneous improvement of the follow-up performance for the, data track. Moreover, the width of the FPC can be further reduced, thus making it possible to form the drive thinner. Furthermore, by separating the patterns into the head line side and the VCM line side, with entirely different signals, into two directions, it becomes possible to prevent noises from being carried on the signal from the magnetic head.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A magnetic disc apparatus, comprising:
    a rocking actuator, said rocking actuator comprising an arm, a rotor connected with said arm for rocking and driving said arm and a voice coil motor for applying a driving force to said rotor;
    a magnetic head for reading data from and writing data to a magnetic disc, said magnetic head being supported by said arm;
    said rotor having a driving center, an outer wall and two projecting portions that are provided on said outer wall radially with respect to the driving center; and
    a flexible printed circuit sheet for transmitting electrical signals to and from said voice coil motor and said magnetic head, said flexible printed circuit sheet comprising a fixing portion and a flexible bending portion, and said flexible bending portion comprising two flexible bending members attached to respective said projecting portions of said rotor and extending to said fixing portion so as to bend in directions opposite to each other.

2. The magnetic disc apparatus of claim 1, wherein on said flexible bending member comprises a magnetic head signal line and the other said flexible bending member comprises a voice coil motor signal line.

3. The magnetic disc apparatus of claim 1, wherein said two flexible bending members provide forces on said rotor acting in opposite rotational directions of said rotor such that the forces provided by said two flexible bending members tend to cancel each other out.

4. A magnetic disc apparatus, comprising:
    a rocking actuator, said rocking actuator comprising an arm, a rotor connected with said arm for rocking a driving said arm and a voice coil motor for applying a driving force to said rotor;
    a magnetic head supported by said arm; and
    a flexible printed circuit sheet electrically connected with said voice coil motor and said magnetic head, said flexible printed circuit sheet comprising a fixing portion and a flexible bending portion, sand said flexible bending portion comprising two flexible bending members attached to and extending between said fixing portion and said rotor such that said two flexible bending members apply forces to said rotor in opposite rotational directions of said rotor.

5. A magnetic disc apparatus of claim 4, wherein said two flexible bending members are bent in opposite directions.

6. The magnetic disc apparatus of claim 5, wherein each said flexible bending member has a concave portion facing the other said flexible bending member.

7. The magnetic disc apparatus of claim 4, said rotor comprises a driving center, an outer wall and two projecting portions that are provided on said outer wall radially with respect to the driving center, said flexible bending members being attached to respective said projecting portions.

8. The magnetic disc apparatus of claim 4, wherein one said flexible bending member comprises a magnetic head signal line and the other said flexible bending member comprises a voice coil motor signal line.

* * * * *